(12) United States Patent
Poornachandran et al.

(10) Patent No.: US 11,750,472 B2
(45) Date of Patent: *Sep. 5, 2023

(54) TELEMETRY TARGETED QUERY INJECTION FOR ENHANCED DEBUGGING IN MICROSERVICES ARCHITECTURES

(71) Applicant: Intel Corporation, Santa Clara, CA (US)

(72) Inventors: Rajesh Poornachandran, Portland, OR (US); Marcos Carranza, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/067,062

(22) Filed: Dec. 16, 2022

(65) Prior Publication Data

US 2023/0198863 A1 Jun. 22, 2023

Related U.S. Application Data

(63) Continuation of application No. 17/557,937, filed on Dec. 21, 2021, now Pat. No. 11,558,265.

(51) Int. Cl.
*H04L 41/5009* (2022.01)
*H04L 43/55* (2022.01)
*G06F 9/455* (2018.01)

(52) U.S. Cl.
CPC ...... *H04L 41/5009* (2013.01); *G06F 9/45558* (2013.01); *H04L 43/55* (2022.05); *G06F 2009/45595* (2013.01)

(58) Field of Classification Search
CPC . H04L 41/5009; H04L 43/55; G06F 9/45558; G06F 2009/45595
See application file for complete search history.

(56) References Cited

U.S. PATENT DOCUMENTS

| | | | |
|---|---|---|---|
| 11,558,265 B1 | 1/2023 | Poornachandran et al. | |
| 2021/0014114 A1* | 1/2021 | Doshi | H04L 41/5019 |
| 2021/0117242 A1 | 4/2021 | Groenendaal et al. | |

FOREIGN PATENT DOCUMENTS

| | | | | |
|---|---|---|---|---|
| CN | 113064700 A | 7/2021 | | |
| EP | 4155932 A1 * | 3/2023 | ............. | G06F 21/44 |

OTHER PUBLICATIONS

Notice of Allowance, U.S. Appl. No. 17/557,937, dated Sep. 29, 2022, 13 pages, USPTO.

* cited by examiner

*Primary Examiner* — Kostas J Katsikis
(74) *Attorney, Agent, or Firm* — JAFFERY WATSON MENDONSA & HAMILTON LLP

(57) ABSTRACT

An apparatus to facilitate telemetry targeted query injection for enhanced debugging in microservices architectures is disclosed. The apparatus includes one or more processors to: identify contextual trace of a previous query recorded in collected data of a service, where microservices of the service responded to the previous query; access an interdependency flow graph representing an architecture and interaction of microservices deployed for a service; retrieve, based on the interdependency flow graph, telemetry data of the microservices corresponding to the contextual trace; identify, based on the telemetry data, an activation profile corresponding to the previous query, the activation profile detailing a response of the microservices to the previous query; compare the activation profile to a correlation profile for the previous query to detect whether an anomaly occurred in the service in response to the previous query; and recommend a modified query based on detection of the anomaly.

20 Claims, 8 Drawing Sheets

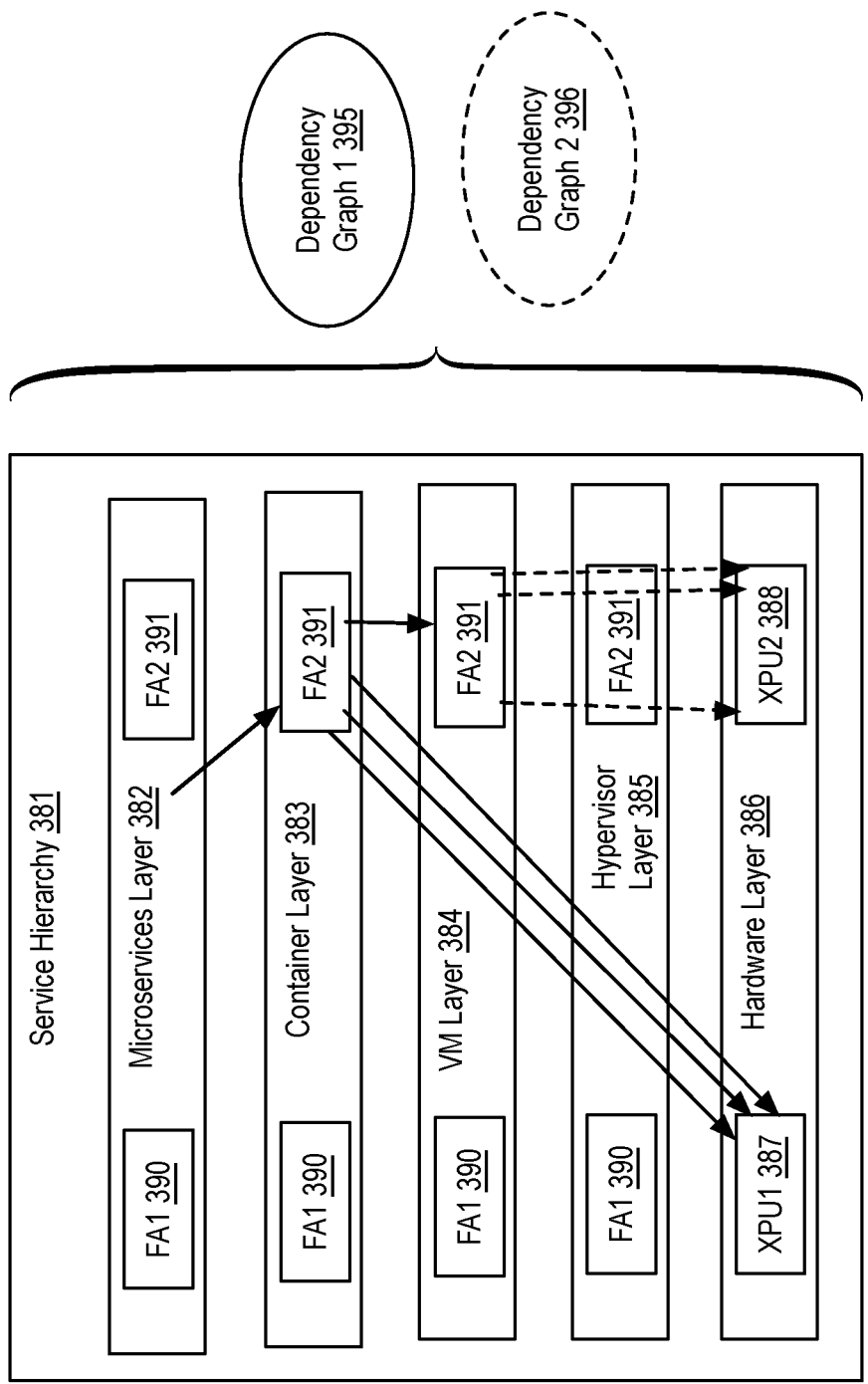

500

---

Identify a contextual trace of a previous query recorded in collected data of a service, where microservices of the service responded to the previous query
510

↓

Access an interdependency flow graph representing an architecture and interaction of microservices deployed for a service
520

↓

Retrieve, based on the interdependency flow graph, telemetry data of the microservices corresponding to the contextual trace
530

↓

Identify, based on the telemetry data, an activation profile corresponding to the previous query, the activation profile detailing a response of the microservices to the previous query
540

↓

Compare the activation profile to a correlation profile for the previous query to detect whether an anomaly occurred in the service in response to the previous query
550

↓

Recommend and configure a modified query based on detection of the anomaly
555

Deploy a failover entity in at least one layer of a microservices architecture of a service, where the layers include at least one of a microservices layer, a container layer, a virtual machine layer, or a hypervisor layer
565

Identify a boundary condition for microservices of the service
570

Generate a query for the failover entity based on the identified boundary condition
575

Inject the query to the failover agent
580

Analyze a response of the failover agent to the query to determine a resiliency of the failover agent
585

FIG. 5B

TELEMETRY TARGETED QUERY INJECTION FOR ENHANCED DEBUGGING IN MICROSERVICES ARCHITECTURES

RELATED APPLICATIONS

This application claims the benefit of priority from and is a continuation of U.S. Patent Application Ser. No. 17/557,937 filed on Dec. 21, 2021, now U.S. Pat. No. 11,558,265, the full disclosure of which is incorporated herein by reference.

FIELD

Embodiments relate generally to data processing and more particularly to telemetry targeted query injection for enhanced debugging in microservices architectures.

BACKGROUND OF THE DESCRIPTION

Datacenters often leverage a microservice architecture to provide for network infrastructure services. A microservice architecture can arrange an application as a collection of loosely-coupled microservices. Microservices can refer to processes that communicate over a network to fulfill a goal using technology-agnostic protocols. In some cases, the microservices may be deployed using a container orchestration platform providing containerized workloads and/or services. The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization. The microservices deployment model provided by the service mesh is becoming increasingly elastic, providing flexibility to scale up and scale down microservices.

In a service mesh environment, a typical worker node in a compute cluster can handle hundreds of container workloads at the same time. These worker nodes may also have statically-attached specialized hardware accelerators optimized for compute intensive tasks. For instance, a class of hardware accelerators can be optimized to efficiently run cryptography and compression algorithms, or to run machine-learning acceleration algorithms. Such hardware accelerators may be provided as a form of disaggregated computing, where the workloads are distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe). Disaggregated computing enables improved resource utilization and lowers ownership costs by enabling more efficient use of available resources. Disaggregated computing also enables pooling a large number of hardware accelerators for large computation making the computation more efficient and better performing.

The microservices deployment model provided by the service mesh is becoming increasingly elastic, providing flexibility to scale up and scale down microservices. As the elasticity of deployment of microservices increases and as microservices architecture transitions to utilizing disaggregated computing resources, there can be microservices deployed for a service across many heterogeneous hardware devices. As such, it is becoming increasingly difficult to provide fine-grained tracing capabilities, including dynamic query generation and injection in such microservices architectures.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers are used throughout the drawing(s) and accompanying written description to refer to the same or like parts.

FIG. 3B a block diagram depicting a failover and mirroring system for implementing query recommendation and generation for capability and resiliency testing, in accordance with implementations herein.

FIG. 5A is a flow diagram illustrating an embodiment of a method for facilitating telemetry targeted query injection for enhanced debugging in microservices architectures.

FIG. 5B is a flow diagram illustrating an embodiment of a method for telemetry targeted query injection for failover resiliency testing in microservices architectures.

DETAILED DESCRIPTION

Figure 1:
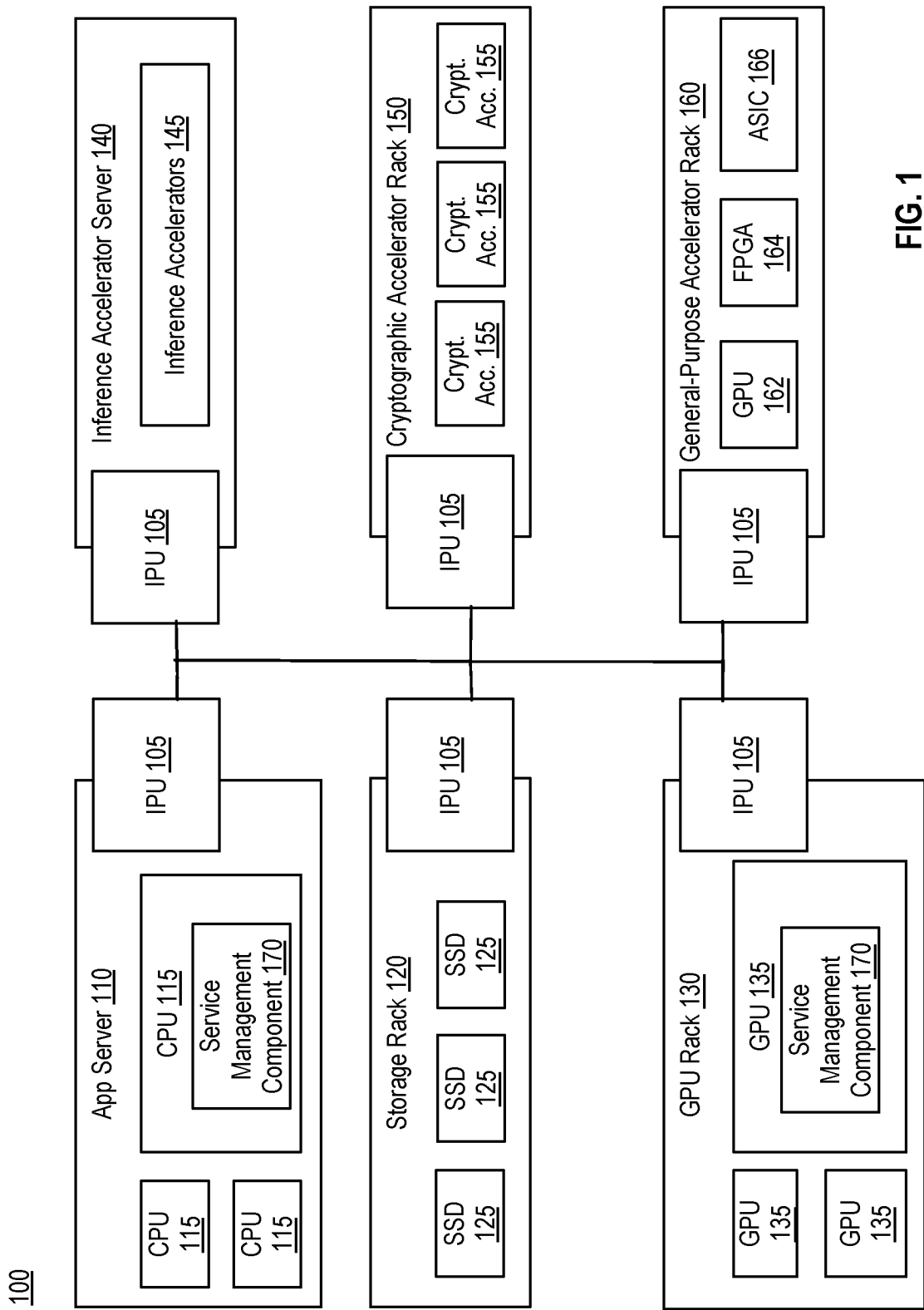
FIG. 1 illustrates a datacenter system that provides for telemetry targeted query injection for enhanced debugging in microservices architectures, in accordance with implementations herein.

Implementations herein describe telemetry targeted query injection for enhanced debugging in microservices architectures.

Cloud service providers (CSPs) are deploying solutions in datacenters where processing of a workload is distributed on various compute resources, such as central processing units (CPUs), graphics processing units (GPUs), and/or hardware accelerators (including, but not limited to, GPUs, field programmable gate arrays (FPGAs), application-specific integrated circuits (ASICs), cryptographic accelerators, compression accelerators, and so on). Traditionally, these compute resources were running on the same platform and connected via physical communication links, such as peripheral component interconnect express (PCIe).

However, disaggregated computing is on the rise in data centers. With disaggregated computing, CSPs are deploying solutions where processing of a workload is distributed on disaggregated compute resources, such as CPUs, GPUs, and hardware accelerators (including FPGAs, ASICs, etc.), that are connected via a network instead of being on the same platform and connected via physical links such as PCIe. Disaggregated computing enables improved resource utilization and lowers ownership costs by enabling more efficient use of available resources. Disaggregated computing also enables pooling a large number of hardware accelerators for large computation making the computation more efficient and better performing.

Hardware accelerators (also referred to herein as a hardware accelerator resources, hardware accelerator devices, accelerator resource, accelerator device, and/or extended resource) as discussed herein may refer to any of special-purpose central processing units (CPUs), graphics processing units (GPUs), general purpose GPUs (GPGPUs), field programmable gate arrays (FPGAs), application-specific integrated circuits (ASICs), inference accelerators, cryptographic accelerators, compression accelerators, other special-purpose hardware accelerators, and so on.

Moreover, the datacenters used by CSPs to deploy a service mesh often leverage a microservice architecture to provide for network infrastructure services of the service mesh. A microservice architecture can arrange an application as a collection of loosely-coupled microservices. The microservices may be the processes that communicate over a network to fulfill a goal using technology-agnostic protocols. In some cases, the microservices can be deployed using a container orchestration platform providing containerized workloads and/or services. In some examples, the service may be a large service comprising hundreds of microservices working in conjunction with each other or may be a modest individual service. A workload may refer to a resource running on the cloud consuming resources, such as computing power. In some embodiments, an application, service, or microservice may be referred to as a workload, which denotes the workload can be moved around between different cloud platforms or from on-premises to the cloud or vice-versa without any dependencies or hassle.

The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization.

As previously noted, the microservices deployment model provided by the service mesh is becoming increasingly elastic, providing flexibility to scale up and scale down microservices. As the elasticity of deployment of microservices increases and as microservices architecture transitions to utilizing disaggregated computing resources, there can be microservices deployed for a service across many heterogeneous hardware devices (e.g., intellectual property core or block (IPs), heterogeneous processing units (XPUs)). As such, it is becoming increasingly difficult to provide fine-grained tracing capabilities, including dynamic query generation and injection in such microservices architectures.

This especially apparent on conventional systems that lack the fine-granular tracing capability. In particular, such conventional systems lack a capability for dynamic query ingestion for a given intricate interdependent set of microservices components. Furthermore, conventional systems lack a capability to discover an activation profile of the microservice hardware resources (e.g., XPUs and IPs) and associated software elements that can be used to provide for fine-grained debugging in today's elastic and disaggregated microservices architectures.

Implementations herein address the above-noted technical drawbacks by providing for telemetry targeted query injection for enhanced debugging in microservices architectures. In implementations herein, techniques are provided for a service management component of a microservices architecture to provide for dynamic query recommendations and ingestion for a given intricate interdependent set of microservices of a service hosted by a service platform. This dynamic query recommendation and ingestion can activate telemetry that is used to detect anomalies for enhanced debugging. The service management component can also discover an activation profile of the microservices in order to dynamically create and/or modify queries for ingestion in the service platform providing the microservices architecture.

Implementations herein provide technical advantages over the conventional approaches discussed above. One technical advantage is that implementations provide for improved tracing, debugging, and performance evaluation utilizing the dynamic query generation and query ingestion techniques described herein. The dynamic query generation and query ingestion techniques can be used to stress microservice component boundaries in a microservices architecture, while optionally providing a mirroring capability for failover and/or resiliency. This leads to improved performance in terms of processing speed and communication latency of the microservices architecture.

FIG. 1 illustrates a datacenter system 100 that provides for telemetry targeted query injection for enhanced debugging in microservices architectures, in accordance with implementations herein. Datacenter system 100 illustrates an example data center (for example, hosted by a cloud service provider (CSP)) providing a variety of XPUs (heterogeneous processing units) for processing tasks at the datacenter, where an XPU can include one or more of: a central processing unit (CPU) 115, a graphics processing unit (GPU) 135 (including a general purpose GPU (GPGPU), ASICs, or other processing units (e.g., accelerators 145, 155, 166, inference accelerators 145, cryptographic accelerators 155, programmable or fixed function FPGAs 164, application-specific integrated circuit (ASICs) 166, compression accelerators, and so on). The datacenter may also provide storage units for data storage tasks, as well. The storage units may include solid state drive (SSD) 125, for example. The XPUs and/or storage units may be hosted with similar-type units (e.g., CPUS 115 hosted on an application server (app server) 110, SSDs 125 hosted on a storage rack 120, GPUs 135 hosted on a GPU rack 130, inference accelerators 145 hosted on an inference accelerator server 140, cryptographic accelerators 155 hosted on a cryptographic accelerator rack 150, and general-purpose accelerators 162, 164, 166 hosted on accelerator rack 160.

The datacenter of system 100 provides its hosted processing components 115, 125, 135, 145, 155, 162, 164, 166 with a variety of offloads using, for example, IPUs 105 that are directly attached to the respective host processing component. Although IPUs 105 are discussed for example purposes, other programmable network devices, such as DPUs or SmartNICs, may be used interchangeable for IPUs 105 herein. The offloads provided may be networking, storage, security, etc. This allows the processing components 115, 125, 135, 145, 155, 162, 164, 166 to run without a hypervisor, and provides CSPs the capability of renting out the entire host in a datacenter to their security-minded customers, or avoid cross-talk and other problems associated with multi-tenant hosts.

An IPU 105 can provide a role in data centers by providing the datacenter operator, such as a Cloud Service Provider (CSP), a control point for security, acceleration, telemetry and service orchestration. IPU 105 architecture may build upon existing Smart Network Interface Card (SmartNIC) features and is a part of controlling security and data acceleration within and across distributed platforms. It is a secure domain controlled by CSPs for managing a platform, providing services to tenants, and securing access into the data center network. The IPU 105 increases the performance and predictability for distributed runtimes and enables scaling to multi-terabit throughputs by offloading host services, reliable transport, and optimizing data copies.

IPUs 105 have grown in complexity over the years, starting with foundational NICs, whose sole purpose was to get packets into the host and out of it. With the addition of networking software offload, the NICs evolved to become SmartNICs, that are capable of offloading functions, such as VSwitch, VIRTIO-Net, AVF, etc. Remote disaggregated storage architectures provide a further evolution, where compute and storage are not co-located anymore, but large compute clusters are connected to large storage clusters over the network. Increase in network speeds, and evolution of protocols made this a possibility. One of the advantages that remote disaggregated storage offers over direct attached storage is that compute and memory can be developed and updated at different cadences. The amount of memory that is attached to a compute node is not limited by physical addition or removal of hard-drives anymore, but can be hot-plugged as a PF to a PCIe Switch. Technologies such as Smart End Point enable IPUs to have firmware-controlled switches, along the PCIe Switch itself to not be limited by hardware implementations.

As discussed above, embodiments herein provide for telemetry targeted query injection for enhanced debugging in microservices architectures. In one implementation, datacenter system 100 includes one or more resources that can implement service management component 170 to provide telemetry targeted query injection for enhanced debugging in microservices architectures. For illustrative example purposes, service management component 170 is shown in the CPU 115 and GPU 135, respectively, of datacenter system 100. However, service management component 170 may operate in one or more of the various other disaggregated resources of datacenter system 100 in accordance with implementations herein. As such, the resources of datacenter system 100 may be in different platforms connected via a network (not shown) in the datacenter system 100. In some implementations, software and/or middleware can cause the resources of datacenter system 100 to logically appear to be in the same platform. Furthermore, transport protocols implemented in software and/or hardware (e.g., network interface cards (NICs)) can make the remote resources logically appear as if they are local resources as well.

Further details of the service management component 170 implementing the telemetry targeted query injection for enhanced debugging in microservices architectures is described below with respect to FIGS. 2-6.

Figure 2:
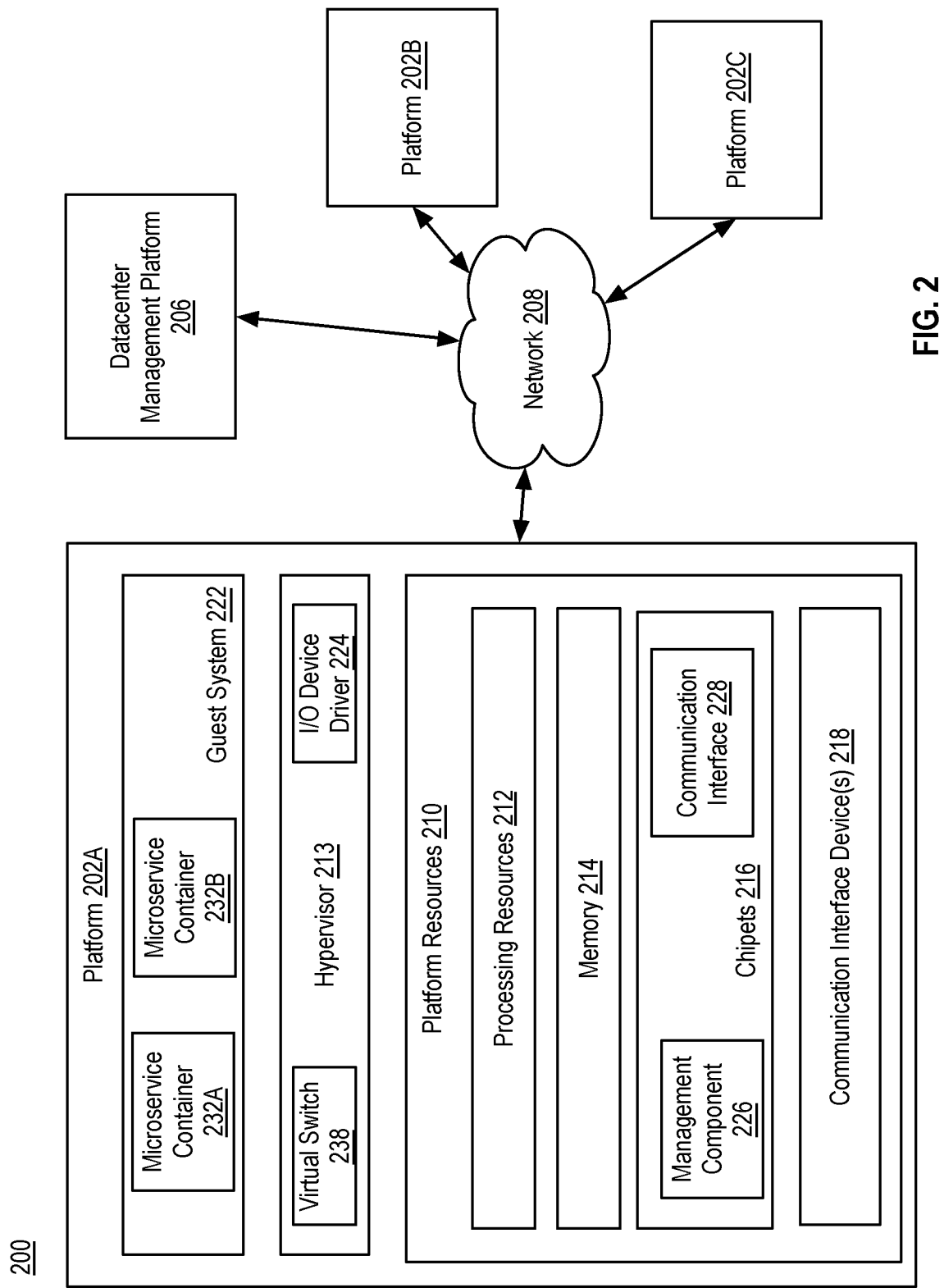
FIG. 2 illustrates a block diagram of components of a computing platform in a datacenter system, according to implementations herein.

FIG. 2 illustrates a block diagram of components of a computing platform 202A in a datacenter system 200, according to implementations herein. In the embodiment depicted, platforms 202A, 202B, and 202C (collectively referred to herein as platforms 202), along with a datacenter management platform 206 are interconnected via network 208. In other embodiments, a computer system may include any suitable number of (i.e., one or more) platforms. In some embodiments (e.g., when a computer system includes a single platform), all or a portion of the datacenter management platform 206 may be included on a platform 202.

A platform 202 may include platform resources 210 with one or more processing resources 212 (e.g., XPUs including CPUs, GPUs, FPGAs, ASICs, other hardware accelerators), memories 214 (which may include any number of different modules), chipsets 216, communication interface device(s) 218, and any other suitable hardware and/or software to execute a hypervisor 213 or other operating system capable of executing workloads associated with applications running on platform 202.

In some embodiments, a platform 202 may function as a host platform for one or more guest systems 222 that invoke these applications. Platform 202A may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things (IoT) environment, an industrial control system, other computing environment, or combination thereof Each platform 202 may include platform resources 210. Platform resources 210 can include, among other logic enabling the functionality of platform 202, one or more processing resources 212 (such as CPUs, GPUs, FPGAs, other hardware accelerators, etc.), memory 214, one or more chipsets 216, and communication interfaces 228. Although three platforms are illustrated, computer platform 202A may be interconnected with any suitable number of platforms. In various embodiments, a platform 202 may reside on a circuit board that is installed in a chassis, rack, or other suitable structure that comprises multiple platforms coupled together through network 208 (which may comprise, e.g., a rack or backplane switch).

In the case of processing resources 212 comprising CPUs, the CPUs may each comprise any suitable number of processor cores and supporting logic (e.g., uncores). The cores may be coupled to each other, to memory 214, to at least one chipset 216, and/or to a communication interface device 218, through one or more controllers residing on the processing resource 212 (e.g., CPU) and/or chipset 216. In some embodiments, a processing resource 212 is embodied within a socket that is permanently or removably coupled to platform 202A. A platform 202 may include any suitable number of processing resources 212.

Memory 214 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 214 may be used for short, medium, and/or long term storage by platform 202A. Memory 214 may store any suitable data or information utilized by platform resources 210, including software embedded in a computer readable medium, and/or encoded logic incorporated in hardware or otherwise stored (e.g., firmware). Memory 214 may store data that is used by cores of processing resources 212. In some embodiments, memory 214 may also comprise storage for instructions that may be executed by the processing resources 212 (e.g., cores of CPUs) or other processing elements (e.g., logic resident on chipsets 216) to provide functionality associated with the management component 226 or other components of platform resources 210.

A platform 202 may also include one or more chipsets 216 comprising any suitable logic to support the operation of the processing resources 212. In various embodiments, chipset 216 may reside on the same die or package as a processing resource 212 or on one or more different dies or packages. Each chipset may support any suitable number of processing resources 212. A chipset 216 may also include one or more controllers to couple other components of platform resources 210 (e.g., communication interface 228 or memory 214) to one or more processing resources 212.

In the embodiment depicted, each chipset 216 also includes a management component 226. Management component 226 may include any suitable logic to support the operation of chipset 216. In a particular embodiment, a management component 226 can collect real-time telemetry data from the chipset 216, the processing resources 212, and/or memory 214 managed by the chipset 216, other components of platform resources 210, and/or various connections between components of platform resources 210.

Chipsets 216 also each include a communication interface 228. Communication interface 228 may be used for the communication of signaling and/or data between chipset 216 and one or more I/O devices, one or more networks 208, and/or one or more devices coupled to network 208 (e.g., datacenter management platform 206). For example, communication interface 228 may be used to send and receive network traffic such as data packets. In a particular embodiment, a communication interface 228 comprises one or more physical network interface controllers (NICs), also known as network interface cards or network adapters. A NIC may include electronic circuitry to communicate using any suitable physical layer and data link layer standard such as Ethernet (e.g., as defined by an IEEE 802.3 standard), FibreChannel, InfiniBand, Wi-Fi, or other suitable standard. A NIC may include one or more physical ports that may couple to a cable (e.g., an Ethernet cable). A NIC may enable communication between any suitable element of chipset 216 (e.g., management component 226) and another device coupled to network 208. In various embodiments, a NIC may be integrated with the chipset 216 (i.e., may be on the same integrated circuit or circuit board as the rest of the chipset logic) or may be on a different integrated circuit or circuit board that is electromechanically coupled to the chipset.

Platform resources 210 may include an additional communication interface 228. Similar to communication interface devices 218, communication interfaces 228 may be used for the communication of signaling and/or data between platform resources 210 and one or more networks 208 and one or more devices coupled to the network 208. For example, communication interface 228 may be used to send and receive network traffic such as data packets. In a particular embodiment, communication interfaces 228 comprise one or more physical NICs. These NICs may enable communication between any suitable element of platform resources 210 (e.g., processing resources 212 or memory 214) and another device coupled to network 208 (e.g., elements of other platforms or remote computing devices coupled to network 208 through one or more networks).

Platform resources 210 may receive and perform any suitable types of workloads. A workload may include any request to utilize one or more resources of platform resources 210, such as one or more cores or associated logic. For example, a workload may comprise a request to instantiate a software component, such as an I/O device driver 224 or guest system 222; a request to process a network packet received from a microservices container 232A, 232B (collectively referred to herein as microservice containers 232) or device external to platform 202A (such as a network node coupled to network 208); a request to execute a process or thread associated with a guest system 222, an application running on platform 202A, a hypervisor 213 or other operating system running on platform 202A; or other suitable processing request.

A microservice container 232 may emulate a computer system with its own dedicated hardware. A container 232 may refer to a standard unit of software that packages up code and all its dependencies, so the application runs quickly and reliably from one computing environment to another. A container image is a lightweight, standalone, executable package of software that includes components used to run an application: code, runtime, system tools, system libraries and settings. Containers 232 take advantage of a form of operating system (OS) virtualization in which features of the OS are leveraged to both isolate processes and control the amount of CPU, memory, and disk that those processes have access to.

When implementing containers 232, hypervisor 213 may also be referred to as a container runtime. Although implementations herein discuss virtualization of microservice functionality via containers, in some implementations, virtual machines may be hosted by hypervisor 213 and utilized to host microservices and/or other components of a service provided by an application.

A hypervisor 213 (also known as a virtual machine monitor (VMM)) may comprise logic to create and run guest systems 222. The hypervisor 213 may present guest operating systems run by virtual machines with a virtual operating platform (i.e., it appears to the virtual machines that they are running on separate physical nodes when they are actually consolidated onto a single hardware platform) and manage the execution of the guest operating systems by platform resources 210. Services of hypervisor 213 may be provided by virtualizing in software or through hardware-assisted resources that utilize minimal software intervention, or both. Multiple instances of a variety of guest operating systems may be managed by the hypervisor 213. Each platform 202 may have a separate instantiation of a hypervisor 213.

In implementations herein, the hypervisor 213 may also be implemented as a container runtime environment capable of building and containerizing applications.

Hypervisor 213 may be a native or bare-metal hypervisor that runs directly on platform resources 210 to control the platform logic and manage the guest operating systems. Alternatively, hypervisor 213 may be a hosted hypervisor that runs on a host operating system and abstracts the guest operating systems from the host operating system. Hypervisor 213 may include a virtual switch 238 that may provide virtual switching and/or routing functions to virtual machines of guest systems 222.

Virtual switch 238 may comprise a software element that is executed using components of platform resources 210. In various embodiments, hypervisor 213 may be in communication with any suitable entity (e.g., a SDN controller) which may cause hypervisor 213 to reconfigure the parameters of virtual switch 238 in response to changing conditions in platform 202 (e.g., the addition or deletion of microservice containers 232 or identification of optimizations that may be made to enhance performance of the platform).

The elements of platform resources 210 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus, to name a few examples.

Elements of the computer platform 202A may be coupled together in any suitable manner such as through one or more networks 208. A network 208 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

In implementations herein, one or more of processing resources 212 and/or microservice containers 232 may provide a service management component (not shown), such as service management component 170 described with respect to FIG. 1. Further details of how the processing resources 212 and/or microservice containers 232 implement the service management component for providing telemetry targeted query injection for enhanced debugging in microservices architectures are described below with respect to FIGS. 3A-6.

Figure 3A:
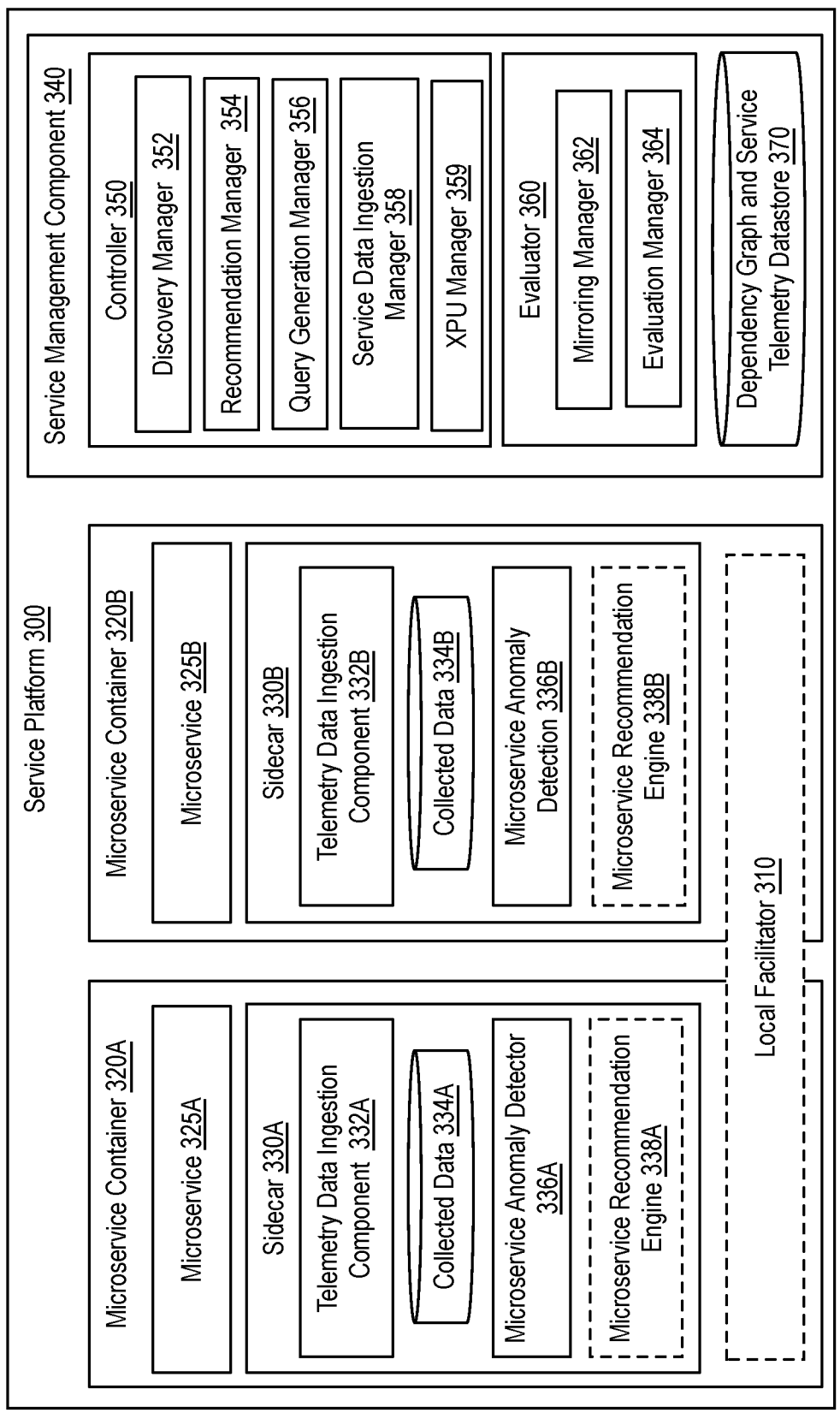
FIG. 3A is a block diagram of a service platform implementing telemetry targeted query injection for enhanced debugging in microservices architectures, in accordance with implementations herein.

FIG. 3A is a block diagram of a service platform 300 implementing telemetry targeted query injection for enhanced debugging in microservices architectures, in accordance with implementations herein. In one implementation, service platform 300 is the same as platform 202 of datacenter system 200 described with respect to FIG. 2. In some implementations, service platform 300 may be hosted in a datacenter that may or may not utilize disaggregated computing. Embodiments herein are not limited to implementation in disaggregated computing environments, and may be deployed across a large spectrum of different datacenter environments. The disaggregated computing datacenter system 200 of FIG. 2 is provided as an example implementation for service platform 300 and is not intended to limit embodiments herein.

In one implementation, service platform 300 may host a service implemented with one or more microservice containers 320A, 320B (collectively referred to herein as microservice container 320). Microservice containers 320 may be the same as microservice containers 232 described with respect to FIG. 2. The service may be orchestrated and manager using service management component 340. Service management component 340 may be implemented by hardware, software, firmware and/or any combination of hardware, software and/or firmware.

Service platform 300 may function as a host platform for a service, implementing deployed microservices of the service as one or more microservice containers 320 that invoke functionalities of the service. Service platform 300 may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things (IoT) environment, an industrial control system, other computing environment, or combination thereof. In implementations herein, containers 320 may be implemented using hardware circuitry, such as one or more of a CPU, a GPU, a hardware accelerator, and so on. In one embodiment, containers 320 may be implemented using platform 202 described with respect to FIG. 2.

Microservices containers 320 may include logic to implement the functionality of the microservice 325A, 325B (collectively referred to herein as microservices 325) and a sidecar 330A, 330B (collectively referred to herein as sidecars 330. A sidecar 330 can be a container that runs on the same pod as the microservice 325. As depicted herein, sidecar 330 is illustrated as part of the microservice container 320, but sidecar 330 may be implemented as a separate container then microservice 325 functionality in some implementations.

A local facilitator 310 is connected to the sidecars 330 and can operate in a privileged space of the microservice containers 320. In one implementation, local facilitator 310 is a privileged daemon with access to low-level information. For example, local facilitator 310 has access to low-level software telemetry and hardware data, such as registries.

In implementations herein, sidecar 330 may include one or more components to support telemetry targeted query injection for enhanced debugging in microservices architectures. These components can include telemetry data ingestion components 332A, 332B (collectively referred to herein as telemetry data ingestion component 332), collected data 334A, 334B (data stores collectively referred to as collected data 334), microservice anomaly detector 336A, 336B (collectively referred to as microservice anomaly detector 336), and (optionally) microservice recommendation engine 338A, 338B (collectively referred to as microservice recommendation engine 338).

Service platform 300 also includes a service management component 340. Service management component 340 and its underlying sub-components may be implemented using hardware circuitry, such as one or more of a CPU, a GPU, a hardware accelerator, and so on. In one embodiment, service management component 340 may be implemented using platform 202 described with respect to FIG. 2. More generally, the example service management component 340 may be implemented by hardware, software, firmware and/or any combination of hardware, software and/or firmware. Thus, for example, the service management component 340 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In one implementation, service management component 340 operates to control management and/or orchestration of resources, such as microservices, for a service of a service mesh hosted by a datacenter, such as datacenter system 100 of FIG. 1. Service management component 340 may located at the same nodes or on a different node of microservice containers 320 in the service platform 300.

Service management component 340 may include one or more components to support telemetry targeted query injection for enhanced debugging in microservices architectures. These components can include a controller 350, an evaluator 360, and a dependency graph and service telemetry datastore 370 (also referred to herein as datastore 370). In implementations herein, the controller 350 can host a discovery manager 352, a recommendation manager 354, a query generation manager 356, a service data ingestion manager 358, and an XPU manager 359. The evaluator can host a mirroring manager 362 and an evaluation manager 364.

In implementations herein, the controller 350, evaluator 360, and dependency graph and service telemetry datastore 370 may operate as part of a trusted execution environment (TEE) (not shown) generated by an underlying computing system(s) hosting the controller 350, evaluator 360, and dependency graph and service telemetry datastore 370. The TEE may be authenticated and protected from unauthorized access using hardware support of the underlying computing system(s). Illustratively, the TEE may be embodied as one or more secure enclaves established using Intel™ SGX technology. The TEE may also include or otherwise interface with one or more drivers, libraries, or other components of the underlying computing system(s) to interface with one or more other XPUs.

In implementations herein, the microservice containers 320 and service management component 340 provide for telemetry targeted query injection for enhanced debugging in microservices architectures. In one implementation, the sidecar 330 for each microservice container 320 includes a telemetry data ingestion component 332 that receives telemetry data of the service platform 300 that is pertinent to the microservice 325. This telemetry data can include lower-level layers in the architecture (e.g., privileged space) and application (microservice 325) telemetry data and logs (e.g., user space). The collected data 334 is a data store that maintains this microservice-related telemetry data for the microservice 325.

The microservice anomaly detection component 336 analyzes telemetry data of the platform that is pertinent to the microservice 325. As noted above, this telemetry data can include lower-level layers in the service platform 300 (e.g., privileged space) and can include application (microservice 325) telemetry data and logs (e.g., user space). The microservice anomaly detection component 336 can provide hooks to capture errors in the applications (e.g., application service level objective (SLO) dictates processing at 30 fps, but instead the application is processing at 28 fps). In implementations herein, the microservice anomaly detection component 336 can consider infrastructure and application SLOs.

To obtain the collected data 334, the microservice anomaly detection component 336 can query the information available in the user space and, in addition, can invoke the local facilitator 310. The local facilitator 310 is connected to the sidecars 330 and has access to low level software telemetry and hardware data such as registries. As such, the local facilitator 310 can query the state of the service platform 300. Based on the collected data 334, the microservice anomaly detection component 336 can determine whether there are any deviations from normal or typical behavior. If a deviation is detection, the microservice anomaly detection component 336 can indicate the anomaly, including its type, to the service management component 340.

At the service management component 340, the controller 350 can provide for dynamic query recommendations and ingestion for a given intricate interdependent set of microservices of the service hosted by the service platform 300. This dynamic query recommendation and ingestion can activate telemetry that is used to detect anomalies for enhanced debugging. The controller 350 can also discover an activation profile of the microservices 325 in order to dynamically create and/or modify queries for ingestion in service platform 300.

In one implementation, controller 350 includes a discovery manager 352 to discover and create an interdependency flow matrix for the service. The interdependency flow matrix mat also be referred to as an interaction matrix or interactive matrix. The interdependency matrix can include a flow graph of services involving the interdependency of hardware devices (e.g., XPUs, IP blocks) and software services used in the service. In one embodiment, this interdependency flow matrix provides a virtual interaction matrix of all microservices of the service that are stitched together to provide the overall service offering of the application. In one implementation, the interdependency flow matrix is stored in dependency graph and service telemetry datastore 370 of service management component 340.

The controller 350 may further include a recommendation manager 354 to generate recommendations on query generation for the service. In one implementation the recommendation manager 354 may access the interdependency flow matrix generated by the discovery manager in order to generate the recommendations on query generation.

In some implementations, the recommendation manager 354 may receive a contextual trace of the query that was previously recorded by the service data ingestion manager 358 of controller 350. In one example, the microservice anomaly detection component 336 can be continuously analyzing the data on the local storage (e.g., collected data 334) to identify deviations from normal behavior and notify the recommendation manager 354. The recommendation manager 354 may interface with the service data ingestion manager 358 to obtain telemetry data for the service for analysis. The service data ingestion manager 358 may receive microservice telemetry data collected by telemetry data ingestion component 332 and stored in collected data 334. For example, the service data ingestion manager 358 may receive telemetry of the service platform 300 (e.g., lower-level layers in the architecture; privileged space) and application telemetry and data logs (e.g., user space).

In one implementation, from the contextual trace of the query, the recommendation manager 354 can identify corresponding telemetry data from the datastore 370 using the interdependency flow matrix. For example, the identified corresponding telemetry data can include the telemetry data generated by the microservices 325 of the service during the time of the query execution.

In some implementations, the recommendation manager 354 may also access an activation profile that is generated based on the telemetry data produced by the microservices 325. The activation profile can represent a functional response to the query, where the response is produced by microservices 325 of the service when responding to the query. For example, the activation profile may identify the interfaces and compute elements (referred to herein as activation points) that are utilized by the service (and its deployed microservices) to provide a response to a query. The activation profile can also include the sequence of responses by the activation points when responding to a query.

The recommendation manager 354 may then compare the activation profile to a reference activation profile, such as a correlation profile. The correlation profile may refer to an observed current state of the service and its deployed microservice 325 in the service platform 300. In some implementations, the correlation profiles may be pre-configured in the service platform 300. In some implementations, the correlation profiles may be learned while the service is deployed and operating in the service platform 300.

In implementations herein, the recommendation manager 354 may use the interdependency flow matrix and/or the activation profile corresponding to a previous query in order to generate a recommendation for a new or modified query for the service. For example, the recommendation manager 354 may identify an activation profile for the previous query using the interdependency flow matrix and telemetry data as described above, and compare that activation profile to a correlation profile for further analysis. For example, the recommendation manager 354 may determine that the activation profile is not stressing a boundary condition sufficiently and may recommend modification of the query to further stress test (e.g., reach a limit of) the boundary condition. Boundary conditions may refer to constraints utilized for the solution of a boundary value problem. In some implementations, a boundary condition is a known value that should be true for the problem that that is being worked on.

In one implementation, the sidecars 330 of microservice container 320 could also implement a microservice recommendation engines 338 based on infrastructure monitoring and cross-monitoring of service level agreement (SLA) metrics. In this case, the recommendations from the microservice recommendation engines 338 can factor into dynamic decisions for trading redundancy for performance, or trading throughput for latency, on a periodic basis.

In one implementation, the recommendation from the recommendation manager 354 is provided to the query generation manager 356 of controller 350. The query generation manager 356 may then create a new query and/or modify an existing query to better target the microservices 325 of the service. In some implementations, the query generated by query generation manager 356 can increase robustness of the service and microservices 325 by stress testing particular targeted component of the service.

In implementations herein, XPU manager 359 of controller 350 may provide for on-boarding and off-boarding of microservices 325 of the service based on the results of the dynamic query injection discussed above. For example, the query injection and system reactions can be captured as transactions that are logged into a blockchain and used at later points in time to diagnose any issues in the service. Based on this diagnosis, XPU manager 359 can cause microservices to be deployed or revoked to improve the robustness of the service in service platform 300. Furthermore, XPU manager 359 can utilize analysis of the transactions to inform future microservice deployments and service configurations for optimized operation of the service in the service platform 300.

In implementations herein, the evaluator 360 can provide for enhanced debugging using the query recommendation and generation for capability and resiliency testing among different failover entities deployed for the service in the service platform. For example, the evaluator 360 can include a mirroring manager 362 to deploy mirroring container and sidecar monitoring. The mirroring manager 362 can deploy a new microservice container 320 and sidecar 330 for a microservice 325 in order to test the capabilities and/or resiliency of the microservice using the query recommendation and generation techniques described above.

FIG. 3B is a block diagram depicting a failover and mirroring system 380 for implementing query recommendation and generation for capability and resiliency testing, in accordance with implementations herein. In one implementation, the failover and mirroring system 380 may be part of service platform 300 described with respect to FIG. 3A. Failover and mirroring system 380 may include a service hierarchy 381 including a plurality of layers. The layers can include, but are not limited to, a microservice layer 382, a container layer 383, a virtual machine (VM) layer 384, a hypervisor layer 385, and a hardware layer 386 including one or more XPUs (e.g., XPU1 387 and XPU2 388). Layers 382 through 385 may include one or more failover agents, such as FA1 390 and FA2 391. The failover agents 390-391 may include duplicate components to a deployed primary component in that particular layer. For example, in the microservices layer FA1 390 and/or FA2 391 may include duplicate microservices containers that mirror already existing deployed microservices containers in the microservices layer 382.

Failover and mirroring system 380 also depicts dependency graphs that are created among the components of the service hierarchy 381. The dependency graph may be the same as the interdependency flow matrix discussed above. There may be multiple dependency graphs in a service hierarchy 381. As shown in FIG. 3B, a dependency graph 1 395 corresponding to the solid line arrows is illustrated and dependency graph 2 396 corresponding to the dashed line arrows is illustrated.

In implementations herein, one or more of the failover agents 391-392 can be deployed in service hierarchy 381 with, for example, different run time options that are determined based on prior observations resulting from the query generation and injection described above. For example, implementations can load components for a microservices container into memory and other resources into a new node in response to the previous history indicates a likelihood of failure to exceed a certain threshold.

Referring back to FIG. 3A, the evaluator 360 also includes an evaluation manager 364 to provide a checks and balance to the controller 350. For example, the evaluation manager 364 can generate evaluation metrics based on whether the query recommendation and generation, as well as the query results, are generating metrics that are meeting quality and service level standards. These evaluation metrics can act as a reward function that encourages positive behaviors from the controller 350 and discourages negative behaviors from the controller 350 (e.g., XPU manager 359 deploying microservices in line with query injection and results that meet quality and service standards). In some implementations, machine learning (ML)-based techniques can be applied for reward-based future improvements. As such, implementations herein provide a check and balances approach between the controller 350 and the evaluator 360.

In implementations herein, the generated query injection and system reaction transaction data (also referred to herein a query telemetry data) can be tracked via a distributed ledger, such as a blockchain. As noted above, the query injection and system reactions can be captured as transactions that are logged into a blockchain and used at later points in time to diagnose any issues in the service. As the blockchain is anonymous, implementations herein could make the blockchain publicly available to help build a reputation score for the microservices. For example, controller 350 may utilize a blockchain integration manager to record the query injection and system reactions transaction metadata in a blockchain that is available via a public ledger. In some implementations, using this anonymous blockchain data, service developers could receive reputation scores (e.g., or receive rewards or payments) in response to their services being indicated as high-quality and/or meeting standards.

Figure 4:
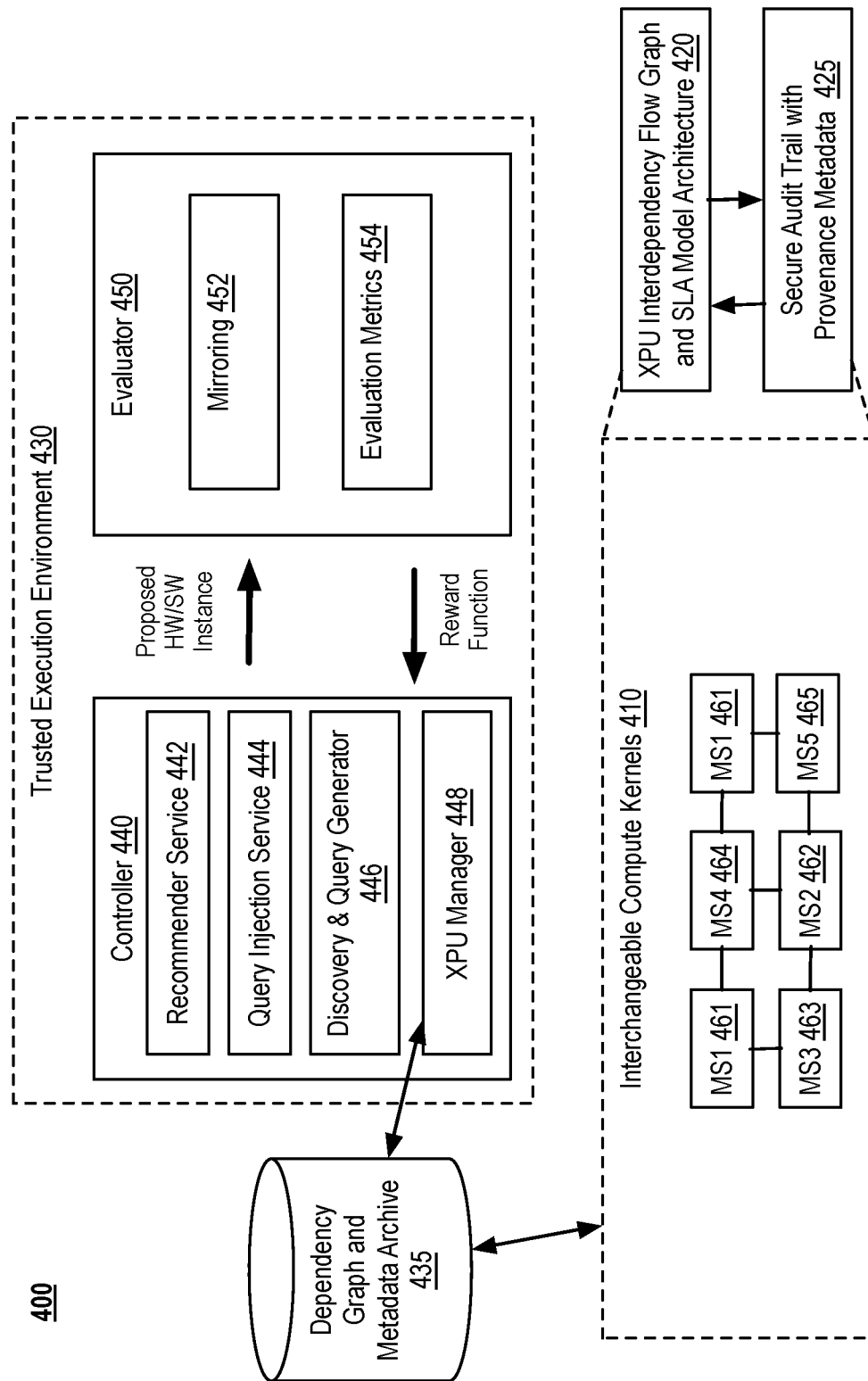
FIG. 4 is a diagram illustrating an operational schematic for telemetry targeted query injection for enhanced debugging in microservices architectures, in accordance with implementations herein.

FIG. 4 is a diagram illustrating an operational schematic 400 for telemetry targeted query injection for enhanced debugging in microservices architectures, in accordance with implementations herein. In one implementations, service management component 340 described with respect to FIG. 3A implements operational schematic 400.

Operational schematic 400 includes a TEE 430 hosting controller 440 and evaluator 450. In one implementation, controller 440 may be the same as controller 350 described with respect to FIG. 3A and evaluator 450 may be the same as evaluator 360 described with respect to FIG. 3A. Controller 440 may include recommender service 442, query injection service 444, discovery and query generator 446, and XPU manager 448. These components may be the same as the similarly named components in service platform 300 described with respect to FIG. 3A. Evaluator 450 may include mirroring 452 and evaluation metrics 454.

In implementations herein, interchangeable compute kernels 410 may include different blocks of compute nodes and/or on different XPUs which run multiple microservices, such as MS1-MS5 461-465. In one implementation, MS1-MS5 461-465 are the same as microservices 325 described with respect to FIG. 3A. These microservices MS1-MS5 461-465 may be part of an XPU interdependency flow graph and SLA model architecture 420 that is monitored using a secure audit trail with provenance metadata 425 as described herein. In one implementation, XPU interdependency flow graph is the same as the interdependency flow graph described above with respect to FIG. 3A.

Utilizing the techniques described above with respect to FIGS. 3A-3B, controller 440 may use recommender service 442 to generate a query recommendation based on interdependency flow graph and other telemetry data stored in dependency graph and metadata archive 435 (also referred to herein as archive 435). The discovery and query generator 446 may generate the interdependency flow graph. The discovery and query generator 446 may also generate a query based on the query recommendation from recommender service 442. Query injection service 444 injects the query into the microservices MS1-5 461-465 of interchangeable compute kernels 410 and collects telemetry data representing the results of the injected query. The resulting telemetry data may be stored in archive 435 as query recommendation and injection results metadata (also referred to herein as query telemetry data). In implementations herein, the query recommendation and injection results metadata may be tracked via blockchain as described above. An XPU manager 448 can enforce one or more provisioned policies for the microservices MS1-MS5 461-465 during run-time of the service, based on the generated query recommendation and injection results metadata.

The evaluator 450 may provide mirroring 452 to deploy mirroring container and sidecar monitoring. For example, the mirroring 452 can deploy a new microservice container and sidecar for a microservice MS1-MS5 461-465 in order to test the capabilities and/or resiliency of the microservice using the query recommendation and generation techniques described above.

The evaluator 450 can also performs checks on the controller 440 using the query recommendation and injection results metadata generated from the injected query from controller 440. For example, the evaluator 450 may perform a check on any hardware or software instances being proposed by the XPU manager 448 to determine that such proposed hardware or software instance is meeting the provisioned policies for the microservice. The evaluator 450 may utilize evaluation metrics 454 to provide feedback to the controller 440 in terms of whether the controller 440 is enforcing provisioned policies correctly based on the evaluated query recommendation and injection results metadata generated from the injected queries generated by controller 440.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc—Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

FIG. 5A is a flow diagram illustrating an embodiment of a method 500 for facilitating telemetry targeted query injection for enhanced debugging in microservices architectures. Method 500 may be performed by processing logic that may comprise hardware (e.g., circuitry, dedicated logic, programmable logic, etc.), software (such as instructions run on a processing device), or a combination thereof. More particularly, the method 500 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof The process of method 500 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, a datacenter system implementing a service management component for a microservices architecture, such as processing device executing a service management component 340 of service platform 300 of FIG. 3A, may perform method 500.

The example process of method 500 of FIG. 5A begins at block 510 where a processing device may identify contextual trace of a previous query recorded in collected data of a service, where microservices of the service responded to the previous query. Then, at block 520, the processing device may access an interdependency flow graph representing an architecture and interaction of microservices deployed for a service.

Subsequently, at block 530, the processing device may retrieve, based on the interdependency flow graph, telemetry data of the microservices corresponding to the contextual trace. Then, at block 540, the processing device may identify, based on the telemetry data, an activation profile corresponding to the previous query. In one implementation, the activation profile can detail a response of the microservices to the previous query.

At block 550, the processing device may compare the activation profile to a correlation profile for the previous query to detect whether an anomaly occurred in the service in response to the previous query. Lastly, at block 555, the processing device may recommend and configure a modified query based on detection of the anomaly.

FIG. 5B is a flow diagram illustrating an embodiment of a method 560 for telemetry targeted query injection for failover resiliency testing in microservices architectures. Method 560 may be performed by processing logic that may comprise hardware (e.g., circuitry, dedicated logic, programmable logic, etc.), software (such as instructions run on a processing device), or a combination thereof. More particularly, the method 560 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 560 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, a datacenter system implementing a service management component for a microservices architecture, such as processing device executing a service management component 340 of service platform 300 of FIG. 3A, may perform method 560.

The example process of method 560 of FIG. 5B begins at block 565 where the processing device may deploy a failover entity in at least one layer of a microservices architecture of a service. In one implementation, the layers can include at least one of a microservices layer, a container layer, a virtual machine layer, or a hypervisor layer. Then, at block 570, the processing device may identify a boundary condition for microservices of the service.

Subsequently, at block 575, the processing device may generate a query for the failover entity based on the identified boundary condition. Then, at block 580, the processing device may inject the query to the failover agent. Lastly, at block 585, the processing device may analyze a response of the failover agent to the query to determine a resiliency of the failover agent.

Figure 6:
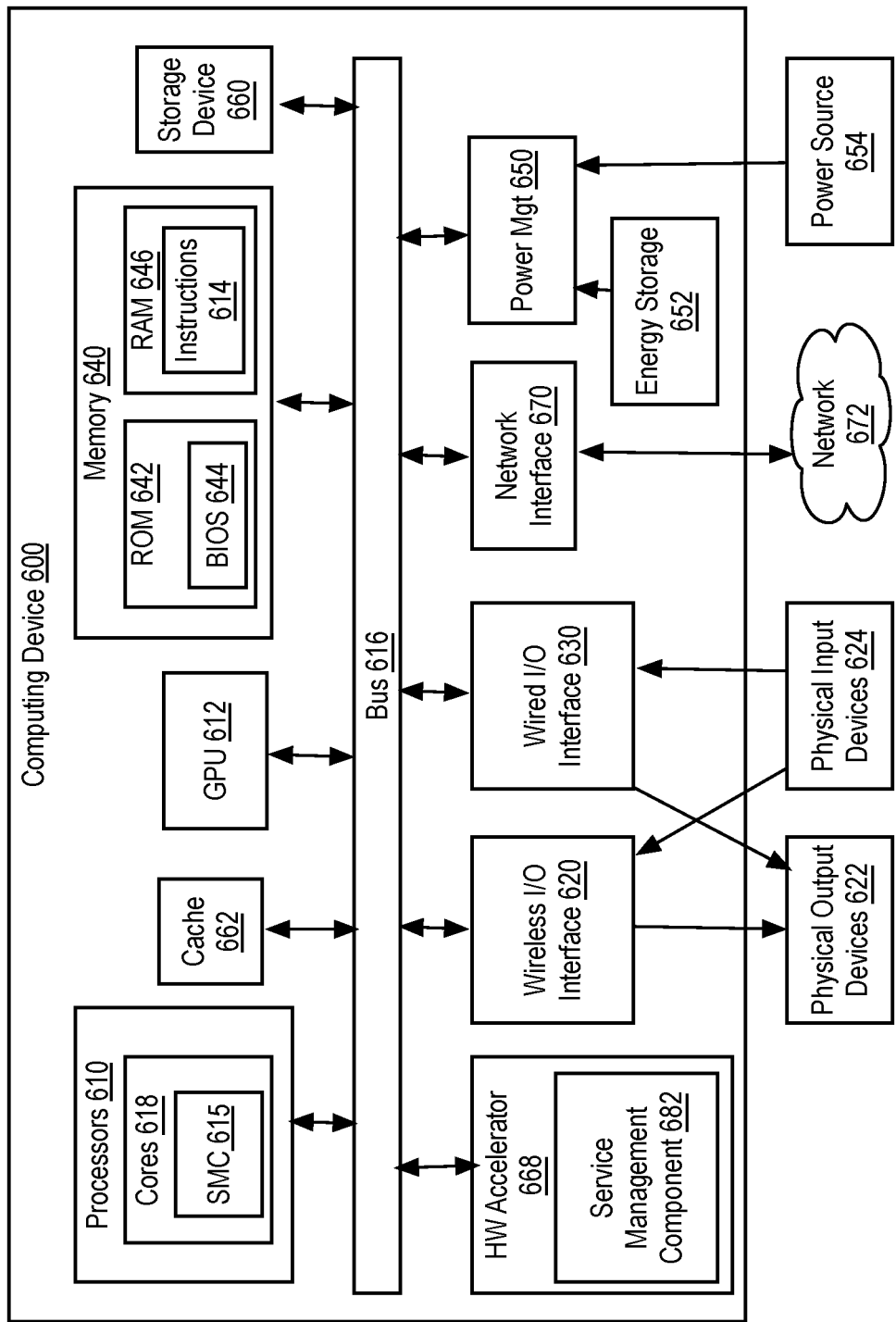
FIG. 6 is a schematic diagram of an illustrative electronic computing device to enable telemetry targeted query injection for enhanced debugging in microservices architectures, according to some embodiments.

FIG. 6 is a schematic diagram of an illustrative electronic computing device 600 to enable telemetry targeted query injection for enhanced debugging in microservices architectures, according to some embodiments. In some embodiments, the computing device 600 includes one or more processors 610 including one or more processors cores 618 including a service management component (SMC) 615, such as a service management component 170, 340 described with respect to FIGS. 1 and 3A. In some embodiments, the one or more processor cores 618 establish a TEE to host the SMC 615. In some embodiments, the computing device 600 includes a hardware accelerator 668, the hardware accelerator including a service management component 682, such as service management component 170, 340 described with respect to FIGS. 1 and 3A. In some embodiments, the hardware accelerator 668 establishes a TEE to host the service management component 682. In some embodiments, the computing device is to provide telemetry targeted query injection for enhanced debugging in microservices architectures, as provided in FIGS. 1-5B.

The computing device 600 may additionally include one or more of the following: cache 662, a graphical processing unit (GPU) 612 (which may be the hardware accelerator in some implementations), a wireless input/output (I/O) interface 620, a wired I/O interface 630, system memory 640 (e.g., memory circuitry), power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 618 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks are not described in further detail herein, as they can be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("FireWire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

The following examples pertain to further embodiments. Example 1 is an apparatus to facilitate telemetry targeted query injection for enhanced debugging in microservices architectures. The apparatus of Example 1 comprises one or more processors to: identify contextual trace of a previous query recorded in collected data of a service, where microservices of the service responded to the previous query; access an interdependency flow graph representing an architecture and interaction of microservices deployed for a service; retrieve, based on the interdependency flow graph, telemetry data of the microservices corresponding to the contextual trace; identify, based on the telemetry data, an activation profile corresponding to the previous query, the activation profile detailing a response of the microservices to the previous query; compare the activation profile to a correlation profile for the previous query to detect whether an anomaly occurred in the service in response to the previous query; and recommend a modified query based on detection of the anomaly.

In Example 2, the subject matter of Example 1 can optionally include wherein storing query telemetry data corresponding to results of the modified query in an archive of the service. In Example 3, the subject matter of any one of Examples 1-2 can optionally include wherein the query telemetry data is recorded in a local blockchain to be available in a trust broker along with other blockchain of query telemetry metadata for the service. In Example 4, the subject matter of any one of Examples 1-3 can optionally include wherein the one or more processors provide a trusted execution environment (TEE) for a controller of the service to recommend the modified query.

In Example 5, the subject matter of any one of Examples 1-4 can optionally include wherein the one or more processors are further to: deploy a failover entity in at least one layer of a microservices architecture of a service, where the at least one layer includes at least one of a microservices layer, a container layer, a virtual machine layer, or a hypervisor layer; identify a boundary condition for microservices of the service; generate a query for the failover entity based on the boundary condition; and inject the query to the failover entity. In Example 6, the subject matter of any one of Examples 1-5 can optionally include wherein the one or more processors are further to analyze a response of the failover entity to the query to determine a resiliency of the failover entity.

In Example 7, the subject matter of any one of Examples 1-6 can optionally include wherein the boundary condition comprises a constraint on the service that is known. In Example 8, the subject matter of any one of Examples 1-7 can optionally include wherein the correlation profile comprises an observed state of the service, and wherein the correlation profile can be at least one of preconfigured or learned while the service is operating. In Example 9, the subject matter of any one of Examples 1-8 can optionally include wherein the activation profile is to identify interfaces and compute elements that are utilized by the service to provide a response to the previous query. In Example 10, the subject matter of any one of Examples 1-9 can optionally include wherein the one or more processors are further to generate one or more evaluation metrics based on whether the modified query generates telemetry data metrics that satisfy at least one of quality or service level thresholds.

Example 11 is a non-transitory computer-readable storage medium for facilitating telemetry targeted query injection for enhanced debugging in microservices architectures. The non-transitory computer-readable storage medium of Example 11 having stored thereon executable computer program instructions that, when executed by one or more processors, cause the one or more processors to perform operations comprising: identifying, by the one or more processors, contextual trace of a previous query recorded in collected data of a service, where microservices of the service responded to the previous query; accessing an interdependency flow graph representing an architecture and interaction of microservices deployed for a service; retrieving, based on the interdependency flow graph, telemetry data of the microservices corresponding to the contextual trace; identifying, based on the telemetry data, an activation profile corresponding to the previous query, the activation profile detailing a response of the microservices to the previous query; comparing the activation profile to a correlation profile for the previous query to detect whether an anomaly occurred in the service in response to the previous query; and recommending a modified query based on detection of the anomaly.

In Example 12, the subject matter of Example 11 can optionally include wherein the operations further comprise storing query telemetry data corresponding to results of the modified query in an archive of the service, wherein the query telemetry data is recorded in a local blockchain to be available in a trust broker along with other blockchain of query telemetry metadata for the service. In Example 13, the subject matter of Examples 11-12 can optionally include wherein the operations further comprise: deploying a failover entity in at least one layer of a microservices architecture of a service, where the at least one layer includes at least one of a microservices layer, a container layer, a virtual machine layer, or a hypervisor layer; identifying a boundary condition for microservices of the service; generating a query for the failover entity based on the boundary condition; and injecting the query to the failover entity.

In Example 14, the subject matter of Examples 11-13 can optionally include wherein the operations further comprise analyzing a response of the failover entity to the query to determine a resiliency of the failover entity. In Example 15, the subject matter of Examples 11-14 can optionally include wherein the one or more processors are further to generate one or more evaluation metrics based on whether the modified query generates telemetry data metrics that satisfy at least one of quality or service level thresholds.

Example 16 is a method for facilitating telemetry targeted query injection for enhanced debugging in microservices architectures. The method of Example 16 can include identifying, by one or more processors, contextual trace of a previous query recorded in collected data of a service, where microservices of the service responded to the previous query; accessing an interdependency flow graph representing an architecture and interaction of microservices deployed for a service; retrieving, based on the interdependency flow graph, telemetry data of the microservices corresponding to the contextual trace; identifying, based on the telemetry data, an activation profile corresponding to the previous query, the activation profile detailing a response of the microservices to the previous query; comparing the activation profile to a correlation profile for the previous query to detect whether an anomaly occurred in the service in response to the previous query; and recommending a modified query based on detection of the anomaly.

In Example 17, the subject matter of Example 16 can optionally include further comprising storing query telemetry data corresponding to results of the modified query in an archive of the service, wherein the query telemetry data is recorded in a local blockchain to be available in a trust broker along with other blockchain of query telemetry metadata for the service. In Example 18, the subject matter of Examples 16-17 can optionally include further comprising: deploying a failover entity in at least one layer of a microservices architecture of a service, where the at least one layer includes at least one of a microservices layer, a container layer, a virtual machine layer, or a hypervisor layer; identifying a boundary condition for microservices of the service; generating a query for the failover entity based on the boundary condition; and injecting the query to the failover entity.

In Example 19, the subject matter of Examples 16-18 can optionally include further comprising analyzing a response of the failover entity to the query to determine a resiliency of the failover entity. In Example 20, the subject matter of Examples 16-19 can optionally include further comprising generating one or more evaluation metrics based on whether the modified query generates telemetry data metrics that satisfy at least one of quality or service level thresholds.

Example 21 is a system for facilitating telemetry targeted query injection for enhanced debugging in microservices architectures. The system of Example 21 can optionally include a memory to store a block of data, and a processor communicably coupled to the memory to: identify contextual trace of a previous query recorded in collected data of a service, where microservices of the service responded to the previous query; access an interdependency flow graph representing an architecture and interaction of microservices deployed for a service; retrieve, based on the interdependency flow graph, telemetry data of the microservices corresponding to the contextual trace; identify, based on the telemetry data, an activation profile corresponding to the previous query, the activation profile detailing a response of the microservices to the previous query; compare the activation profile to a correlation profile for the previous query to detect whether an anomaly occurred in the service in response to the previous query; and recommend a modified query based on detection of the anomaly.

In Example 22, the subject matter of Example 21 can optionally include wherein storing query telemetry data corresponding to results of the modified query in an archive of the service. In Example 23, the subject matter of any one of Examples 21-22 can optionally include wherein the query telemetry data is recorded in a local blockchain to be available in a trust broker along with other blockchain of query telemetry metadata for the service. In Example 24, the subject matter of any one of Examples 21-23 can optionally include wherein the one or more processors provide a trusted execution environment (TEE) for a controller of the service to recommend the modified query.

In Example 25, the subject matter of any one of Examples 21-24 can optionally include wherein the one or more processors are further to: deploy a failover entity in at least one layer of a microservices architecture of a service, where the at least one layer includes at least one of a microservices layer, a container layer, a virtual machine layer, or a hypervisor layer; identify a boundary condition for microservices of the service; generate a query for the failover entity based on the boundary condition; and inject the query to the failover entity. In Example 26, the subject matter of any one of Examples 21-25 can optionally include wherein the one or more processors are further to analyze a response of the failover entity to the query to determine a resiliency of the failover entity.

In Example 27, the subject matter of any one of Examples 21-26 can optionally include wherein the boundary condition comprises a constraint on the service that is known. In Example 28, the subject matter of any one of Examples 21-27 can optionally include wherein the correlation profile comprises an observed state of the service, and wherein the correlation profile can be at least one of preconfigured or learned while the service is operating. In Example 29, the subject matter of any one of Examples 21-28 can optionally include wherein the activation profile is to identify interfaces and compute elements that are utilized by the service to provide a response to the previous query. In Example 30, the subject matter of any one of Examples 21-29 can optionally include wherein the one or more processors are further to generate one or more evaluation metrics based on whether the modified query generates telemetry data metrics that satisfy at least one of quality or service level thresholds.

Example 30 is an apparatus for facilitating telemetry targeted query injection for enhanced debugging in microservices architectures, comprising means for identifying contextual trace of a previous query recorded in collected data of a service, where microservices of the service responded to the previous query; means for accessing an interdependency flow graph representing an architecture and interaction of microservices deployed for a service; means for retrieving, based on the interdependency flow graph, telemetry data of the microservices corresponding to the contextual trace; means for identifying, based on the telemetry data, an activation profile corresponding to the previous query, the activation profile detailing a response of the microservices to the previous query; means for comparing the activation profile to a correlation profile for the previous query to detect whether an anomaly occurred in the service in response to the previous query; and means for recommending a modified query based on detection of the anomaly. In Example 31, the subject matter of Example 30 can optionally include the apparatus further configured to perform the method of any one of the Examples 17 to 20.

Example 32 is at least one machine readable medium comprising a plurality of instructions that in response to being executed on a computing device, cause the computing device to carry out a method according to any one of Examples 16-20. Example 33 is an apparatus for facilitating telemetry targeted query injection for enhanced debugging in microservices architectures, configured to perform the method of any one of Examples 16-20. Example 34 is an apparatus for facilitating telemetry targeted query injection for enhanced debugging in microservices architectures, comprising means for performing the method of any one of claims 16 to 20. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
one or more processors to:
identify contextual trace of a previous query recorded in collected data of a service, where microservices of the service responded to the previous query;
retrieve, based on an interdependency flow graph representing microservices deployed for the service, telemetry data of the microservices corresponding to the contextual trace;
identify, based on the telemetry data, an activation profile corresponding to the previous query, the activation profile detailing a response of the microservices to the previous query; and
detect, based on a comparison of the activation profile to a correlation profile for the previous query, whether an anomaly occurred in the service in response to the previous query.

2. The apparatus of claim 1, wherein the one or more processors are further to recommend a modified query based on detection of the anomaly, and are further to store query telemetry data corresponding to results of the modified query in an archive of the service.

3. The apparatus of claim 2, wherein the query telemetry data is recorded in a local blockchain to be available in a trust broker along with other blockchain of query telemetry metadata for the service.

4. The apparatus of claim 2, wherein the one or more processors provide a trusted execution environment (TEE) for a controller of the service to recommend the modified query.

5. The apparatus of claim 1, wherein the one or more processors are further to:
deploy a failover entity in at least one layer of a microservices architecture of a service, where the at least one layer includes at least one of a microservices layer, a container layer, a virtual machine layer, or a hypervisor layer;
identify a boundary condition for microservices of the service;
generate a query for the failover entity based on the boundary condition; and
inject the query to the failover entity.

6. The apparatus of claim 5, wherein the one or more processors are further to analyze a response of the failover entity to the query to determine a resiliency of the failover entity.

7. The apparatus of claim 5, wherein the boundary condition comprises a constraint on the service that is known.

8. The apparatus of claim 1, wherein the correlation profile comprises an observed state of the service, and wherein the correlation profile can be at least one of pre-configured or learned while the service is operating.

9. The apparatus of claim 1, wherein the activation profile is to identify interfaces and compute elements that are utilized by the service to provide a response to the previous query.

10. The apparatus of claim 2, wherein the one or more processors are further to generate one or more evaluation metrics based on whether the modified query generates telemetry data metrics that satisfy at least one of quality or service level thresholds.

11. A non-transitory computer-readable storage medium having stored thereon executable computer program instructions that, when executed by one or more processors, cause the one or more processors to perform operations comprising:
identifying, by the one or more processors, contextual trace of a previous query recorded in collected data of a service, where microservices of the service responded to the previous query;
retrieving, based on an interdependency flow graph representing microservices deployed for the service, telemetry data of the microservices corresponding to the contextual trace;
identifying, based on the telemetry data, an activation profile corresponding to the previous query, the activation profile detailing a response of the microservices to the previous query; and
detecting, based on a comparison of the activation profile to a correlation profile for the previous query, whether an anomaly occurred in the service in response to the previous query.

12. The non-transitory computer-readable storage medium of claim 11, wherein the operations further comprise:
recommending a modified query based on detection of the anomaly; and
storing query telemetry data corresponding to results of the modified query in an archive of the service, wherein the query telemetry data is recorded in a local blockchain to be available in a trust broker along with other blockchain of query telemetry metadata for the service.

13. The non-transitory computer-readable storage medium of claim 11, wherein the operations further comprise:
deploying a failover entity in at least one layer of a microservices architecture of a service, where the at least one layer includes at least one of a microservices layer, a container layer, a virtual machine layer, or a hypervisor layer;
identifying a boundary condition for microservices of the service;
generating a query for the failover entity based on the boundary condition; and
injecting the query to the failover entity.

14. The non-transitory computer-readable storage medium of claim 13, wherein the operations further comprise analyzing a response of the failover entity to the query to determine a resiliency of the failover entity.

15. The non-transitory computer-readable storage medium of claim 12, wherein the one or more processors are further to generate one or more evaluation metrics based on whether the modified query generates telemetry data metrics that satisfy at least one of quality or service level thresholds.

16. A method comprising:
identifying, by one or more processors, contextual trace of a previous query recorded in collected data of a service, where microservices of the service responded to the previous query;
retrieving, based on an interdependency flow graph representing microservices deployed for the service, telemetry data of the microservices corresponding to the contextual trace;
identifying, based on the telemetry data, an activation profile corresponding to the previous query, the activation profile detailing a response of the microservices to the previous query; and
detecting, based on a comparison of the activation profile to a correlation profile for the previous query, whether an anomaly occurred in the service in response to the previous query.

17. The method of claim 16, further comprising:
recommending a modified query based on detection of the anomaly; and
storing query telemetry data corresponding to results of the modified query in an archive of the service, wherein the query telemetry data is recorded in a local blockchain to be available in a trust broker along with other blockchain of query telemetry metadata for the service.

18. The method of claim 16, further comprising:
deploying a failover entity in at least one layer of a microservices architecture of a service, where the at least one layer includes at least one of a microservices layer, a container layer, a virtual machine layer, or a hypervisor layer;
identifying a boundary condition for microservices of the service;
generating a query for the failover entity based on the boundary condition; and
injecting the query to the failover entity.

19. The method of claim 18, further comprising analyzing a response of the failover entity to the query to determine a resiliency of the failover entity.

20. The method of claim 17, further comprising generating one or more evaluation metrics based on whether the modified query generates telemetry data metrics that satisfy at least one of quality or service level thresholds.

\* \* \* \* \*